(12) United States Patent
Barrett et al.

(10) Patent No.: US 7,282,153 B2
(45) Date of Patent: Oct. 16, 2007

(54) METHOD FOR REMOVAL OF ARSENIC FROM WATER

(75) Inventors: James Henry Barrett, Feasterville, PA (US); Jose Antonio Trejo, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/058,129

(22) Filed: Feb. 15, 2005

(65) Prior Publication Data
US 2005/0205495 A1    Sep. 22, 2005

Related U.S. Application Data

(60) Provisional application No. 60/627,196, filed on Nov. 12, 2004, provisional application No. 60/547,310, filed on Feb. 24, 2004.

(51) Int. Cl.
*C02F 1/42* (2006.01)
(52) U.S. Cl. .............. 210/688; 210/679; 210/681; 210/683; 210/684; 210/911
(58) Field of Classification Search ............ 210/679, 210/681, 683, 911, 660, 684, 688
See application file for complete search history.

(56) References Cited

U.S. PATENT DOCUMENTS

| | | | | |
|---|---|---|---|---|
| 3,092,617 | A * | 6/1963 | Feldt et al. ................ | 521/25 |
| 3,332,737 | A | 7/1967 | Kraus ....................... | 423/6 |
| 3,590,011 | A * | 6/1971 | Grachev et al. ............ | 521/25 |
| 4,284,726 | A * | 8/1981 | Shigetomi ................. | 521/28 |
| 4,477,957 | A * | 10/1984 | Inman ..................... | 29/402.08 |
| 4,576,969 | A | 3/1986 | Echigo et al. ............. | 521/28 |
| 4,578,195 | A * | 3/1986 | Moore et al. ............. | 210/679 |
| 5,114,592 | A * | 5/1992 | Schuster et al. .......... | 210/667 |
| 5,252,003 | A | 10/1993 | McGahan .................. | 405/128 |
| 5,453,201 | A | 9/1995 | Etzel et al. .............. | 210/668 |
| 5,591,346 | A | 1/1997 | Etzel et al. .............. | 210/668 |
| 5,804,606 | A | 9/1998 | Surowiec et al. .......... | 521/32 |
| 6,077,809 | A | 6/2000 | Suzuki et al. ............. | 502/400 |
| 6,180,016 | B1 * | 1/2001 | Johnston et al. .......... | 210/767 |
| 6,187,192 | B1 * | 2/2001 | Johnston et al. ......... | 210/502.1 |
| 6,254,312 | B1 | 7/2001 | Chowdhury et al. ..... | 405/128.5 |
| 6,368,510 | B2 | 4/2002 | Friot ....................... | 210/670 |
| 6,543,964 | B2 | 4/2003 | Chowdhury et al. ..... | 405/128.5 |
| 6,833,075 | B2 * | 12/2004 | Hughes ..................... | 210/679 |
| 6,861,002 | B2 * | 3/2005 | Hughes ..................... | 210/681 |
| 2002/0042450 | A1 | 4/2002 | Lailach et al. ............. | 521/30 |
| 2002/0125195 | A1 | 9/2002 | Jensen et al. ............. | 210/670 |
| 2003/0139629 | A1 | 7/2003 | Vandersall et al. ........ | 568/388 |
| 2004/0108275 | A1 | 6/2004 | Shaniuk .................... | 210/688 |
| 2005/0093189 | A1 | 5/2005 | Vo ............................ | 264/29.1 |
| 2006/0037913 | A1 | 2/2006 | Gottlieb et al. | |

FOREIGN PATENT DOCUMENTS

| | | |
|---|---|---|
| DE | 198 26 186 A1 * | 12/1999 |
| WO | WO 03/068683 A1 | 8/2003 |
| WO | 2004/110623 | 12/2004 |
| WO | WO 2005/023409 A2 | 3/2005 |

OTHER PUBLICATIONS

Perry et al., Ion Exchange: Key Parameters for Arsenic Removal, presented at the Water Quality Technology Conference, Nov. 5, 2000.

Alexandratos et al., GEOC 51 A New Highly Selective Resin for the Removal of Arsenate in Groundwater, presented at American Chemical Society Meeting, Sep. 2003.

Scamehorn et al., GEOC 48 Removal of Arsenic Anions From Water Using Polyelectrolyte-Enhanced Ultrafiltration, presented at American Chemical Society Meeting, Sep. 2003.

Shevade et al., GEOC 50 Utility of Zeolites in Arsenic Removal From Water, presented at the American Chemical Society Meeting, Sep. 2003.

Denizli et al., Dithiocarbamate-Incorporated Monosize Polystyrene Microspheres for Selective Removal of Mercury Ions, Reactive & Functional Polymers, vol. 44, pp. 235-243(2000).

Haron et al., Sorption of Arsenate and Arsenite Anions By Iron(III)-Poly (Hydroxamic Acid) Complex, Chemosphere, vol. 39, No. 14, pp. 2459-2466 (1999).

Styles et al., Sorption of Arsenic Anions Onto Poly(ethylene Mercaptoacetimide), Reactive & Functional Polymers, vol. 31, pp. 89-102 (1999).

Dominguez et al., Design of Polyvinyl Alcohol Mercaptyle Fibers for Arsenite Chelation, Reactive & Functional Polymers, vol. 53, pp. 205-215 (2002).

Cumbal et al., Polymer Supported Inorganic Nanoparticles: Characterization and Environmental Applications, Reactive & Functional Polymers, vol. 54, pp. 167-180 (2003).

Chanda et al., Ligand Exchange Sorption of Arsenate and Arsenite Anions by Chelating Resins in Ferric Ion Form: II. Iminodiacetic.., Reactive Polymers, vol. 8, pp. 85-95(1987).

Rau et al., Arsenic(V) Adsorption by Immodilized Iron Mediation. Modeling of the Adsorption Process and Influence of interfering.., Reactive Polymers, vol. 54, pp. 85-94 (2003).

Demarco et al., Arsenic Removal Using a Polymeric/Inorganic Hybrid Sorbent, Water Research, vol. 37, pp. 164-176 (2003).

Suzuki et al., Preparation of Porous Resign Loaded with Crystalline Hydrous Zirconium Oxide and Its Application to the Removal.., Reactive Polymers, vol. 43, pp. 165-172 (2000).

(Continued)

Primary Examiner—Duane Smith
Assistant Examiner—Robert A Clemente
(74) Attorney, Agent, or Firm—Kenneth Crimaldi

(57) ABSTRACT

A method for removing arsenic from water by contacting water with a strong base anion exchange resin comprising at least one metal ion or metal-containing ion whose arsenate salt has a $K_{sp}$ no greater than $10^{-5}$, provided that the metal is not zirconium.

5 Claims, No Drawings

OTHER PUBLICATIONS

Chanda et al., Ligand Exchange Sorption of Arsenate and Arsenite Anions by Chelating Resins In Ferric Ion Form: I. Weak-Base . . . , Reactive Polymer, vol. 7, pp. 251-261 (1988).

Trung et al., Preconcentration or Arsenic Species in Environmental Waters by Solid Phase Extraction Using Metal-loaded Chelating Resins, Analytical Sciences, vol. 17, pp. 1219-1222 (2001).

LeNoble et al., Dynamic Arsenic Removal on a Mn02-loaded Resin, Journal of Colloid and Interface Science, No. 1, vol. 280, pp. 61-67, (2004).

Katsoyiannia et al., Removal of Arsenic from Contaminated Water Sources by Sorption onto iron-oxide-coated Polymeric materials, Water Research, No. 20, vol. 36, pp. 5141-5155 (2002).

* cited by examiner

METHOD FOR REMOVAL OF ARSENIC FROM WATER

CROSS REFERENCE TO RELATED PATENT APPLICATIONS

This is a non-provisional application of prior pending U.S. Provisional Application Ser. No. 60/547,310, filed Feb. 24, 2004 and U.S. Provisional Application Ser. No. 60/627,196, filed Nov. 12, 2004.

This invention relates to a method for removal of arsenic from water which contains arsenic, and to a method for post-treatment of a resin containing bound arsenic.

Arsenic is present in water primarily in the form of arsenate or arsenite, each of which is extremely toxic. There are numerous reports of resins used to treat water to remove various arsenic-containing ions. For example, removal of arsenic-containing ions using a cation exchange resin loaded with Fe(III) is reported in M. J. DeMarco et al., *Water Research*, vol. 37, pp. 164-176 (2003). However, this reference contains no disclosure relating to other types of ion exchange resins.

The problem addressed by this invention is to provide alternative methods for removal of arsenic from water using resin materials.

STATEMENT OF THE INVENTION

The present invention is directed to a method for removing arsenic from water by contacting water with a strong base anion exchange resin comprising at least one metal ion or metal-containing ion whose arsenate salt has a $K_{sp}$ no greater than $10^{-5}$, provided that the metal is not zirconium.

The invention is further directed to a method for removing arsenic from water by contacting water with an ion exchange resin having at least one substituent selected from hydroxy, ether, amine, quaternary amine, a divalent sulfur substituent, amine oxide and hydroxy amine.

The invention is further directed to a method for removing arsenic from water by contacting water with a cation exchange resin containing at least one metal ion or metal-containing ion comprising a metal selected from aluminum, lanthanum, calcium, magnesium, titanium, zinc, nickel, cobalt, manganese, lithium and tin.

The invention is further directed to a method for removing arsenic from water by contacting water with an adsorbent resin containing at least one metal ion or metal-containing ion whose arsenate salt has a $K_{sp}$ no greater than $10^{-5}$, provided that the metal is not zirconium.

DETAILED DESCRIPTION OF THE INVENTION

Percentages are weight percentages, unless specified otherwise. As used herein the term "(meth)acrylic" refers to acrylic or methacrylic. The term "vinyl monomer" refers to a monomer suitable for addition polymerization and containing a single polymerizable carbon-carbon double bond. The term "styrene polymer" indicates a copolymer polymerized from a vinyl monomer or mixture of vinyl monomers containing styrene monomer and/or at least one crosslinker, wherein the combined weight of styrene and crosslinkers is at least 50 weight percent of the total monomer weight. A crosslinker is a monomer containing at least two polymerizable carbon-carbon double bonds, including, e.g., divinylaromatic compounds, di- and tri-(meth)acrylate compounds and divinyl ether compounds. Preferably, the crosslinker(s) is a divinylaromatic crosslinker, e.g., divinylbenzene. In one embodiment, a styrene polymer is made from a mixture of monomers that is at least 75% styrene and divinylaromatic crosslinkers, more preferably at least 90% styrene and divinylaromatic crosslinkers, and most preferably from a mixture of monomers that consists essentially of styrene and at least one divinylaromatic crosslinker. In another embodiment, a styrene polymer is made from a monomer mixture consisting essentially of at least one divinylaromatic crosslinker. The term "acrylic polymer" indicates a copolymer formed from a mixture of vinyl monomers containing at least one (meth)acrylic acid or ester, along with at least one crosslinker, wherein the combined weight of the (meth)acrylic acid(s) or ester(s) and the crosslinker(s) is at least 50 weight percent of the total monomer weight; preferably at least 75%, more preferably at least 90%, and most preferably from a mixture of monomers that consists essentially of at least one (meth)acrylic acid or ester and at least one crosslinker. The term "phenolic resin" indicates a crosslinked copolymer formed from formaldehyde (or an aliphatic aldehyde or ketone) and phenol (or a substituted phenol, or other aromatic compound), wherein the weight of phenol or substituted phenol monomer is at least 10% of the total monomer weight, preferably at least 50%.

The term "polyamine condensate resin" indicates a crosslinked copolymer formed from polyamines and an epoxy compound (e.g., epichlorohydrin), wherein the weight of the epoxy compound is at least 10% of the total monomer weight, preferably at least 50%.

The term "polyvinylalcohol resin" indicates a crosslinked copolymer formed from crosslinked vinyl acetate and then deacetylated to form the respective polyol structure wherein the weight of the remaining acetate-containing monomer units is at least 10% of the total polymer weight, preferably at least 50%.

A "hydroxy amine" is any substituent having at least one hydroxy functional group and at least one amine functional group. Preferably, a hydroxy amine is an aliphatic substituent having more than one hydroxy group, wherein each hydroxy group is attached to a different carbon atom. A "divalent sulfur substituent" is a substituent having at least one sulfur atom which is connected to other atoms via two single bonds, including, for example, thiol, thiocarbamate, dithiocarbamate, sulfide, thiocarbonate, dithiocarbonate, trithiocarbonate, thioester and xanthate substituents. A quaternization reaction is one in which a tertiary amine substituent is converted to a quaternary amine by addition of an alkyl group. Aminolysis is a reaction in which an amine reacts with a functional group in a polymer to form a stable compound such as an amide or alkyl amine. Functional groups on a polymer include, e.g., an ester functional group of a meth(acrylic) acid monomer unit, and a benzyl ether or chloromethyl group in a polystyrene. Chloromethylation is the alkylation reaction which places a chloromethyl group on an aromatic ring.

The term "gel" or "gellular" resin applies to a resin which was synthesized from a very low porosity (0 to 0.1 cm³/g), small average pore size (0 to 17 Å) and low B.E.T. surface area (0 to 10 m²/g) copolymer. The term "macroreticular" (or MR) resin is applied to a resin which is synthesized from a high mesoporous copolymer with higher surface area than the gel resins. The total porosity of the MR resins is between 0.1 and 0.7 cm³/g, average pore size between 17 and 500 Å and B.E.T. surface area between 10 and 200 m²/g. The term adsorbent is applied to a resin which can be functionalized or not, and which has very high surface area and porosity. These adsorbents have surface area between 200 and 1300

$m^2/g$, average pore size between 17 and 1000 Å and total porosity between 0.7 and 200 $cm^3/g$. The term "cation exchange resin" indicates a resin which is capable of exchanging positively charged species with the environment. They comprise negatively charged species which are linked to cations such as $Na^+$, $K^+$, $Ca^{++}$, $Mg^{++}$, $Fe^{+++}$ or $H^+$. The most common negatively charged species are carboxylic, sulfonic and phosphonic acid groups. The term "anion exchange resin" indicates a resin which is capable of exchanging negatively charged species with the environment. The term "strong base anion exchange resin" refers to an anion exchange resin that comprises positively charged species which are linked to anions such as $Cl^-$, $Br^-$, $F^-$ and $OH^-$. The most common positively charged species are quaternary amines and protonated secondary amines.

The term "hydrous oxide" indicates very insoluble compounds in water which are formed from the precipitation of a metal cation with a pH increase in the original solution. The hydrous oxide may be essentially oxides or hydroxides of a single metal or of a mixture of two or more metals. The charge on a hydrous oxide species depends largely upon the degree of acidity of the oxide and the media. They can exist as negatively, neutral or positively charged species. Variations in precipitation conditions for metal ions result in different structures that can be relatively more or less reactive towards arsenic ions in water. In general, the preferred pH range for precipitation of metals as hydrous oxides is from 2 to 8, most preferably from 3.5 to 6.5. The structure of the metallic hydrous oxides can be amorphous or crystalline.

An example of the behavior of metal hydroxides at different pH values is that Fe(III) is totally soluble at low pH (less than 1.5) in water at ambient temperature. At high pH and high caustic concentration, another soluble structure is obtained, namely $Fe(OH)_4^-$. The precipitation of Fe(III) starts at a pH of 2-3, depending on the presence of chelating agents and the experimental conditions. The complex stability of $Fe(III)L_x$ (L is a ligand) might affect the precipitation pH value. Inside the pH range for precipitation, Fe(III) forms $Fe(O)_x(OH)_y$ (oxy hydroxides) and/or $Fe(OH)_3$ (hydroxide). The structure of the precipitated compound among many others might be: Goethite, Akaganeite, Lepidocrocite or Schwertmannite. Another example is aluminum; at a pH<2 it exists as $Al^{3+}$ (totally soluble in water), at a pH between 7-9, as precipitated $Al(OH)_3$ and at pH higher than 12, as $AlO^{2-}$ (totally soluble in water).

The methods used to load metals into resins in this invention are described below:

Metal Loading on Anion or Cation Exchange Resins

Metals can be physically entrapped in the resins, or for the case of cation exchange resins, the metal cation in solution can interact with the negatively charged polymeric material, whereas an anionic metal ion in solution can interact with a positively charged anion exchange resin. The pH in the resin will determine the conditions of precipitation to obtain hydrous oxides within the resin structure. Another possibility for metal loading is to equilibrate a metal cation solution at low pH with the anion exchange resin. If the pH is changed drastically, precipitation of metal occurs. Typically, the precipitation conditions comprise a very high pH, which solubilizes the metal as a metal-containing anion within the resin. In this manner, the metal will be evenly distributed and can then react with the positively charged functionality of the anion exchange resin. After this stage, the pH can be lowered gradually, with the effect of precipitating the metal as a hydrous oxide or oxides. A similar procedure can be followed using high pH metal-containing solution with cation exchange resin, with the respective pH changes.

Metal Loading in Uncharged Polymeric Materials (Adsorbents):

Another method to precipitate metals in uncharged polymeric materials is described herein. The polymeric material is equilibrated with a metal salt solution at a metal concentration of 5 to 60% weight/volume. The concentration to be used is affected by the amount of metal that is needed to be precipitated within the polymeric material and by the solubility of the metal used. Once the metal ions are inside the polymeric structure the excess of water is drained leaving the polymeric material with metal inside. A drastic pH change or drying conditions can then be applied to precipitate the metals as hydrous oxides or oxides.

The temperature at which precipitation occurs also affects the microstructure obtained during the precipitation. Preferably, precipitation is done near ambient temperature, i.e., ca. 20° C. to 35° C. In one embodiment of the invention, the level of metal compound contained in a resin (based on dry resin) is at least 2%, more preferably from 2% to 20%, and most preferably from 8% to 20%. Levels of metal compounds are measured by ICP.

In strong base anion exchange resins, the preferred metals are iron, calcium, magnesium, aluminum, lanthanum, titanium, zinc, nickel, cobalt, manganese, lithium and tin. In cation exchange resins, the preferred metals are calcium, magnesium, aluminum, lanthanum, titanium, zinc, nickel, cobalt, manganese, lithium and tin. In adsorbents, the preferred metals are iron, calcium, magnesium, aluminum, lanthanum, titanium, zinc, nickel, cobalt, manganese, lithium and tin.

In one embodiment of this invention, after the resin is used to remove arsenic from water, post-treatment of the resin is done to render the arsenic less susceptible to leaching by water. Typically, post-treatment is performed when the resin contains a level of arsenic near its maximum capacity, or near its desired loading capacity, and prior to disposal of the resin. Preferably, the post-treatment agent is capable of immobilizing arsenic within the resin sufficiently to pass the EPA Toxicity Characteristic Leaching Procedure (TCLP) test, Method 1311, which is used to demonstrate compliance with Land Disposal Restrictions (LDR) for arsenic, or other leaching tests designated by regulatory authorities. Typically the resin has absorbed at least 10 mg As/(g dry resin) from water. In some cases, the resin has absorbed at least 80 mg As/(g dry resin). Preferably, the post-treatment agent is a salt of a metal ion or metal-containing ion which binds arsenic in the resin, most preferably a metal ion which precipitates arsenate ion in aqueous solution, i.e., a metal whose arsenate salt has a $K_{sp}$ no greater than $10^{-5}$. Preferably, the amount of the post-treatment agent added to the resin (based on dry resin) is at least 2%, more preferably at least 5%, more preferably at least 10%, and most preferably at least 15%. Preferably, the amount of post-treatment agent is no more than 35%, more preferably no more than 30%, more preferably no more than 25%, and most preferably no more than 20%. Preferred metals for post-treatment include, for example, ions of iron, aluminum, lanthanum, titanium, zinc, nickel, cobalt, manganese, lithium and tin. More preferably, the metal ion is selected from ions of iron, aluminum, lanthanum, titanium, manganese and zinc. Most preferably, the metal ion is selected from ions of iron, manganese, aluminum and titanium.

In one embodiment of the invention in which arsenic is removed from water by contacting water with an ion exchange resin having at least one substituent selected from hydroxy, ether, amine, quaternary amine, a divalent sulfur substituent, amine oxide and hydroxy amine; preferably the resin has at least one substituent selected from thiocarbamate, dithiocarbamate, sulfide, thiocarbonate, dithiocarbonate, trithiocarbonate, thioester, xanthate, amine oxide, phosphonic acid, iminodicarboxylic acid and hydroxy amine. In this embodiment, preferably, the resin is substantially free of metals other than sodium before it is used to treat water for arsenic removal, i.e., it contains less than 300 ppm of such metals, based on dry weight of the resin.

In one embodiment of the invention, the resin is a metal-chelating resin which has a chelating substituent selected from phosphonic acids, sulfonic acids, dithiocarbamates, polyethyleneimines, polyamines, hydroxy amines, carboxylic acids, aminocarboxylic acids and aminoalkylphosphonates. Preferred aminocarboxylic substituents include, for example, substituents derived from nitrilotriacetic acid, ethylenediamine tetraacetic acid (EDTA), diethylenetriamine pentaacetic acid, tris(carboxymethyl)amine, iminodiacetic acid, N-(carbamoylmethyl)iminodiacetic acid, N,N-bis(carboxymethyl)-B-alanine and N-(phosphonomethyl)iminodiacetic acid. In another embodiment of the invention, the level of metal compound(s) contained in the resin based on the dry weight of the resin is at least 2%, more preferably at least 5%, more preferably at least 10%, and most preferably at least 15%. Preferably the level of metal compound is no more than 35%, more preferably no more than 25%, and most preferably no more than 20%. In one embodiment of the invention, the resin is a macroreticular or macroporous resin.

In another embodiment of the invention, the resin is a porous adsorbent copolymer in which a salt of a metal compound which binds arsenic has been precipitated or imbibed. Preferably, the level of the metal compound(s) contained in the resin, based on the dry weight of the resin, is at least 5%, more preferably at least 10%, and most preferably at least 15%. Preferably, the level of metal compound is no more than 35%, more preferably no more than 30%, and most preferably no more than 25%. Preferably, the copolymer is a porous adsorbent. Preferably, the metal which binds arsenic is a metal ion capable of giving very insoluble arsenates on the copolymer surface or interior at a pH from 2 to 11, preferably in a pH range from 4 to 9.

In one embodiment of the invention, water to be treated is surface or ground water containing at least 10 ppm of sulfate ion and from 10 ppb to 10 ppm of arsenic compounds, more preferably from 10 ppb to 800 ppb, and most preferably from 10 to 400 ppb. The pH of the water preferably is in the range from 4 to 10, and more preferably from 6 to 9 for ground water and from 5 to 9 for surface water. In another embodiment of the invention, water to be treated has arsenic levels as described above, but is low in sulfate. Such water is derived either from natural low-sulfate sources, or from water which has been pre-treated to reduce sulfate levels prior to contact with the arsenic-selective resins used in the present invention. Low levels of sulfate are considered to be from 0-250 ppm, medium levels are 250-1000 ppm and high levels are higher than 1000 ppm.

Preferably, the resin used in this invention is a styrene polymer, an acrylic polymer or a phenolic resin. In an embodiment of the invention in which the resin is a crosslinked poly(vinylaromatic) copolymer, functionalized resins typically are prepared via the chloromethyl derivative of the resin. Chloromethylation of poly(vinylaromatic) copolymers is well known; see, e.g., U.S. Application No. 2003/0018091 A1 and U.S. Pat. No. 4,900,796. In an embodiment of this invention in which the resin is a crosslinked acrylic copolymer, functionalized resins typically are prepared via formation of amides or esters with carboxylic acid groups on the acrylic polymer. In another embodiment of the invention, amine groups on a resin are oxidized to provide amine oxide substituents.

An embodiment of this invention is to increase the selectivity towards arsenic compounds by converting a resin having a primary, secondary or tertiary amine functional group to a resin having quaternary ammonium functionality via alkylation of the amine functional group.

In one embodiment of the invention, the resin is a mono-dispersed resin, i.e., one having a uniformity coefficient from 1.0 to 1.3, more preferably from 1.0 to 1.05. The uniformity coefficient is the mesh size of the screen on which about 40% of the resin is retained divided by the mesh size of the screen on which about 90% of the resin is retained. In one embodiment, the mono-dispersed resin is a jetted resin, see, e.g., U.S. Pat. No. 3,922,255.

In one embodiment of the invention, the resin is a seed-expanded resin, see, e.g., U.S. Pat. No. 5,147,937.

Resins useful for arsenic removal in the following method include the following commercially available Rohm and Haas Company resins:

Amberlite™ IRA-958S is an MR type, acrylic, strongly basic anion exchange resin in the chloride form. The functionality is a propyl trialkylammonium group attached to the acrylic backbone via an amide linkage. It is crosslinked with divinylbenzene and diethyleneglycol divinyl ether;

Amberlite™ IRC-50 is a weakly acidic, macroporous type acrylic ion exchange resin. It is a copolymer of methacrylic acid and divinylbenzene.

DUOLITE A7 is a crosslinked phenol-formaldehyde polycondensate containing weak base anion exchange functionality.

Amberlite™ IRA-67 is a gel type, acrylic, weakly basic anion exchange resin. The functionality is a dimethylaminopropyl group (DMAPA). attached to the acrylic backbone via an amide linkage;

Amberlite™ IRA96 is a chloromethylated macroreticular styrene/divinylbenzene (DVB, 6%) resin aminated with dimethylamine, and then oxidized with hydrogen peroxide.

Amberlite™ IRC 747 is a macroreticular styrene/divinylbenzene (DVB, 6%) which contains alkylaminophosphonic groups.

Amberlite™ IRC 743 is a polyol macroreticular resin based on a styrene/divinylbenzene copolymer which is aminated using N-methyl-glucamine.

Amberlite™ IRC 748 is a porous crosslinked styrene resin functionalized with an iminodicarboxylic acid group.

Amberlite™ SR1LNa is a crosslinked DVB-styrene gel resin, sulfonated cationic resin.

Amberlite™ 200CNa is a crosslinked DVB-styrene macroreticular resin, sulfonated cationic resin in Na form.

Amberlyst™ 121 resin is a lightly crosslinked DVB-styrene gel resin, sulfonated with sulfuric acid Amberlyst™ 15 resin is a highly crosslinked DVB-styrene macroreticular sulfonated cationic resin.

Amberlite™ IRA-400 is a crosslinked styrene gel resin, chloromethylated and ctionalized with trimethylamine.

Amberlite™ IRA-900 is a crosslinked styrene macroreticular resin, chloromethylated and functionalized with trimethylamine.

Amberlite™ IRA-410 is a crosslinked styrene gel resin, chloromethylated and functionalized with dimethylethanolamine.

Amberlite™ IRA-910 is a crosslinked styrene macroreticular resin, chloromethylated and functionalized with dimethylethanolamine Duolite GT-73 is a crosslinked styrene resin containing sulfhydryl groups.

Amberlite™ XAD-4 is a high-surface-area ethylstyrene-DVB macroreticular

The present invention also encompasses a resin useful for removing arsenic from water, and comprising at least two substituents selected from hydroxy, thiocarbamate, dithiocarbamate, sulfide, thiocarbonate, dithiocarbonate, trithiocarbonate, thioester, xanthate, amine oxide, phosphonic acid, iminodicarboxylic acid and hydroxy amine.

In addition to removing arsenic-containing ions, e.g., arsenate and arsenate from water, it is believed that the resins of the present invention remove other common contaminants from water, e.g., ions containing Cd, Zn, Cu, Cr, Hg, Pb, Ni, Co, Mo, W, V, F, Sb and Se, as well as phosphates, perchlorate and borates.

EXAMPLES

| Abbreviations: | |
|---|---|
| p(St-DVB) | Styrene-Divinylbenzene Copolymer |
| CME | Chloromethyl Methyl Ether |
| CSA | Chlorosulfonic Acid |
| HCHO | Formaldehyde |
| MeOH | Methanol |
| meq/ml | Milliequivalents/Milliliter |
| meq/g | Milliequivalents/Gram (dry) |
| % PB | % perfect beads (whole and crack-free) |
| MR | Macroreticular |
| mg of As/g dry resin | milligrams of arsenic per gram of dry resin |
| $m^2/g$ | Surface area units: square meter per gram of resin. |
| Å | Angstroms. Used for average pore diameter in resins. |
| MHC | Moisture Hold Capacity |
| DVB | Divinylbenzene |
| GFH | Ground Ferric Hydroxide |
| FeOOH | Ferric hydrous oxide(s) |
| BV | Bead volumes. # Volume of liquid/Volume of ion exchange resin or adsorbent in column. |
| Q | Quaternization Reaction Product of a Tertiary amine with methylchloride. |
| w/v | Weight of solute per volume of liquid |

Example 1

Preparation of a Cation Exchange Resin Loaded with Zirconium

The preparation of a cation exchange styrene/DVB resin loaded with zirconium may be found in the U.S. Patent No. 2003/0139629 A1.

Example 2

Chloromethylation Process for Gel Styrene-DVB Copolymers

This is a description of the use of a conventional stirred (agitated) quench procedure with no recovery and recycle of the reaction liquor. A chloromethylated intermediate is prepared by adding 244 g of CSA over a 4 hour period to an agitated reaction vessel containing 106 g of p(St-DVB) containing 4.3% DVB, 136 g of an aqueous formaldehyde solution (55% formaldehyde, 35% MeOH), 40 g of aqueous HCl (35%), 32 g of MeOH and a sufficient amount (typically about 15 g) aqueous ferric chloride (40%) solution to provide a molar ratio of ferric chloride to p(St-DVB) of 0.04/1. The temperature of the reaction mixture during the CSA addition is maintained at 40° C. and below. After completion of the CSA addition, the reaction mixture is held at 38-40° C. for a period of 2.5 hours with agitation. The reaction mixture is cooled to 25-30° C. and a quench solution (330 g of water) is added to the chloromethylated intermediate while agitating. After mixing the quenched reaction mixture for 10-30 minutes, the mother liquor is drained from the bottom of the reaction vessel into a collection bottle until 380 g have been collected (% $H_2SO_4$=28%, calculated). The chloromethylated intermediate is then washed with additional water as described above.

Example 3

Amination of the Halomethylated Gellular Styrenic-DVB Copolymer

The term "Amine" is used to describe the specific amine used in the example, which is a 40% aqueous solution of trimethylamine.

The washed chloromethylated intermediate from example 2. is slurried with 200-400 g of water and neutralized with 50% aqueous NaOH to a pH of 8-10; this is followed by the addition of 176 g of the Amine with cooling to maintain a temperature of 20-25° C. The temperature of the reaction mixture is then raised to 50° C. over 3 hours and held at 50° C. for an additional 2 hours. At this point 8 g of a 50% aqueous NaOH solution is added to the reaction mixture and excess trimethylamine is recovered by distillation. The resultant anion exchange resin beads (SBA) are drained free of residual liquid, and washed with hot water and dilute aqueous HCl to remove residual iron and Amine contaminants. The resulting SBA typically has an anion exchange capacity of 1.3 meq/ml (4.1 meq/g) with 99% PB.

Example 4

Preparation of a Chloromethylated Macroreticular poly(styrene-DVB) Copolymer A chloromethylated intermediate was prepared by gradually adding 178 g of CSA to an agitated mixture containing 100 g of macroporous p(St-DVB) containing 6% DVB, 134 g of an aqueous formaldehyde solution (55% formaldehyde, 35% MeOH), 216 g of 96% sulfuric acid, 91 g of aqueous HCl (35%), 14 g of MeOH, and ferric chloride solution. The ferric chloride was employed as a 40% aqueous solution in amount to provide a molar ratio of ferric chloride to p(St-DVB) of 0.04/1. The temperature of the reaction mixture during the CSA addition was maintained at 45° C. and below. After completion of the CSA addition, the reaction mixture was held at 40-50° C. for a period of 6 hours with agitation.

The reaction mixture was then cooled to 25-30° C., the agitation was stopped and the mixture was allowed to settle for at least 5 minutes up to 1 hour. An initial portion of liquid was drained from the bottom of the bead bed into a collection bottle. A quench solution (240 g of water) was then slowly added to the top of the bead bed while draining additional liquid g from the bottom of the reaction vessel into the same collection bottle, until all liquid had been drained from the bead bed; in this manner 550 g of mother liquor (% $H_2SO_4$=56%) was collected. The chloromethylated intermediate was then washed by adding additional water to the top of the bead bed while draining liquid from the bottom.

Example 5

Amination of a Chloromethylated Macroreticular Styrenic-DVB Copolymer

The term Amine herein is used to describe the specific amine used in the example. The amine used in this example is a 40% aqueous solution of dimethylamine.

The washed chloromethylated intermediate was slurried with 200-400 g of water and neutralized with 50% aqueous NaOH to a pH of 8-10. This was followed by the addition of 535 g of 24% aqueous NaOH and 190 g of Amine with cooling to maintain a temperature of 20-25° C. The temperature of the reaction mixture was then raised from 25° C. to 74° C. and held at 74° C. for an additional 2 hours under pressure (0.7-1.4×10$^2$ kPa or 10-20 pounds per square inch), followed by distillation to remove residual amine. The resultant anion exchange resin beads (WBA) were drained free of residual liquid, and washed with hot water and dilute aqueous HCl to remove residual iron and Amine contaminants. The resulting WBA had an anion exchange capacity of 1.4 meq/ml (5.0 meq/g) with 100% PB.

Example 6

Preparation of a Macroreticular Strong Base Acrylic Resin

The copolymer used to manufacture this resin is a macroreticular (MR)-type methyl acrylate polymer crosslinked with divinylbenzene (5% w/w) and diethyleneglycol divinyl ether (2.0% w/w). The resin obtained following the next process is a MR, acrylic, strongly basic anion exchange resin in the chloride form. The functionality is a propyl trialkylammonium group attached to the acrylic backbone via an amide group. The conversion of the copolymer to anionic resin is done in two steps; aminolysis with dimethylaminopropylamine (DMAPA) followed by aminolysis and quaternization.

Aminolysis:

2960 g of Dimethylaminopropylamine (DMAPA) are charged in the reactor as well as 791 g of the acrylic copolymer. This process is run at high temperature (170-189° C.), under nitrogen pressure between 35-50 psig for 8-9 hours. When the time is done purge with nitrogen the lines and vent the reactor as it cools down. Cool down the reactor to 20-40° C. Drain the mother liquor from the batch. Add methanol until the level is above the resin bed. Continue draining and adding more fresh methanol for 3 hours. Start feeding water to the top of the bed, draining to maintain the water level above the resin bed. Wash thoroughly with water for 2 hours. Drain the reactor and hand screen the final resin.

Quaternization:

Transfer the lot from the previous step to the reactor with water (2 liters). Add 460 g of methyl chloride. The temperature of the reaction should be 25° C. and pressure less than 5 psig. Hold the temperature between 30 and 40° C. for 2-9 hours. Vent the reactor, drain the lot and wash it with large excess of water (15 times the volume of the reactor) for 7 hours (draining and filling continuously). The product is then drained and packed.

Example 7

Preparation of Jetted Resin

The preparation of a jetted styrene/DVB copolymer having a uniformity coefficient between 1.0-1.3 may be found in the U.S. Pat. No. 3,922,255A in example 1.0.

Example 8

Preparation of a Uniform Particle Size Copolymer by a Seed Expansion Process

The preparation of a controlled, uniform sized copolymer using a seed expansion process is described in the U.S. Pat. No. 5,147,937 A. Example 1.0.

Example 9

Preparation of an MR Styrene/Divinylbenzene (DVB, 6%) Amine Oxide-Functionalized Anion Exchange Base Resin The chloromethylation step was done by following Example 4 for a macroreticular macroporous styrenic copolymer.

Amination:

The amination was done by following the process described in Example 4 and using a 40% aqueous solution of dimethylamine as the Amine.

Oxidation Steps:

The oxidation step ensures the modification from the tertiary amine to an amine oxide structure. The ratio of initial copolymer to hydrogen peroxide is 6.0. For the following example 20 g of hydrogen peroxide water solution (35% w/w) were used. Agitate for 2 hours under 3 bar. Wash with large excess of water, drain the lot and pack it.

Example 10

Preparation of Strong—Weak Base Anion Exchange Resins with Hydroxy Amine and/or Imine Functionalities The chloromethylation step was done by following the Example 2 process for a gellular styrenic-DVB copolymer.
Amines that were used in this process:

| Amines: | Acronyms | Resin Obtained | Vol. Cap. meq/ml | Weight Cap meq/g |
|---|---|---|---|---|
| 2-methyl amino ethanol | MAE | SBA | 0.62 | 1.30 |
| Diethanolamine | DEA | WBA | 1.19 | 2.72 |
| Diisopropanolamine | DIPA | WBA | 1.06 | 2.48 |
| N,N dimethyl diisopropylenetriamine | DMDIPTA | SBA-WBA | 1.50 | 4.25 |
| Triethanolamine ethoxylated | TEAE | SBA | 1.38 | 3.45 |
| Diethylentriamine | DETA | WBA | 0.86 | 1.63 |
| Pentaethylenhexamine | PEHA | WBA | 1.07 | 2.24 |
| Polyethyleneimine | PEI | WBA | 1.52 | 3.21 |

-continued

| Amines: | Acronyms | Resin Obtained | Vol. Cap. meq/ml | Weight Cap meq/g |
|---|---|---|---|---|
| bis-hexamethylentriamine | HMTA | SBA-WBA | 0.98 | 2.30 |
| Tributylamine 1.59 | TBA | SBA | 0.72 | 1.59 |

(SBA = Strong Base Anion, WBA = Weak Base Anion, SBA-WBA = combination of strong and weak base in the resin).

Amination

To the washed chloromethylated intermediate was then added 220 g of water and 165-200 g of isobutanol. This mixture was agitated and neutralized (pH of 11-13) with 50% aqueous NaOH. To this mixture at least 100% in excess of the stoichiometric amount of amine (from the previous table) was added to the reactor. The mixture was then heated to 77-89° C. for 48 hours. The lot was washed with excess methanol and water. The resultant anion exchange resin beads (SBA) were drained free of residual liquid, and washed with hot water and dilute aqueous HCl to remove residual contaminants. The resin was then drained and packed.

Example 11

Preparation of a Strong—Weak Base Anion Exchange Resins with Hydroxy Amine Functionality The chloromethylation step was done by following the Example 2 process for a gellular styrenic-DVB copolymer.

To the washed chloromethylated intermediate was then added 350 g of water. This mixture was agitated and neutralized (pH of 11-13) with 50% aqueous NaOH. To this mixture was added 200-300 g of dimethylethanolamine (DMEA) (95%), followed by holding the temperature of the reaction mixture at 75-90° C. for 8-72 hours. The lot was washed with excess methanol and water. The resultant anion exchange resin beads (SBA) were drained free of residual liquid, and washed with hot water and dilute aqueous HCl to remove residual iron and the amine contaminants. The resulting SBA had an anion exchange capacity of 0.5-2.1 meq/ml.

Example 12

Preparation of an Amine-Functionalized Resin

The chloromethylation step was done by following the example 4 process for a macroreticular macroporous styrenic-DVB copolymer.

Amination:

The washed chloromethylated intermediate was slurried with 200-400 g of water and neutralized with 50% aqueous NaOH to a pH of 8-10. The reactor is charged with 100 ml of water, 25 g of sodium chloride and 4 g of boric acid prior to the 100 ml of the chloromethylated copolymer. Once the reactor is charged and agitated then it is cooled to <25° C. and then 150 g of diethylentriamine (DETA) was charged over 60 minutes maintaining a batch temperature of <25° C. The lot was then heated to 70° C. over a period of 130 minutes. The temperature was then held at 70° C. for 360 minutes. 150 ml of water was then charged to the vessel. Siphon out the aqueous mixture and recharge more water. Continue the process until the liquid is clear. Then charge 100 ml of hot water (50° C.) and 200 ml of 0.1 N hydrochloric acid (35%). Agitate for 10 minutes. Adjust pH with acid to >1.0. Rinse the beads with water and pack the lot.

Example 13

Preparation of a Strong Base Phenol-Formaldehyde Polycondensate Resin

A sample of a suitable commercially available polymeric phenol-formaldehyde resin is DUOLITE A7 which is manufactured by Rohm and Haas Company. Philadelphia, United States of America was quaternized by the following method.

Quaternization:

Quaternization can be accomplished by the following procedure. Charge 80-120 g of DUOLITE A7 into the reactor and charge 200-300 ml of methanol. Add 100-150 g of methyl chloride. The temperature of the reaction should be 10-25° C. and pressure less than 5 psig. Hold the temperature below 30° C. for 24 hours. Drain the lot and wash it with large excess of water (15 times the volume of the reactor) for 7 hours (draining and filling continuously). The product is then drained and packed.

Example 14

Preparation of a Resin Having Thiol Functionality

An MR-type, Styrene/DVB (6% DVB) copolymer is functionalized with thiol groups.

Charge 250-320 g of dichloroethane (EDC) to a reactor. Then charge 50-100 g of copolymer, 100-200 g sulfur monochloride and adjust the temperature to be between 20-30° C. Add 15-32 g of chlorosulfonic acid (CSA) over 5.0 hours. Do not allow the reactor temperature to exceed 45° C. Heat the reactor to 82-90° C., and hold at this temperature for 6.0-10 hours. Cool down to <50° C. and add water over 6-9 hours. Heat the reactor and distill the dichloroethane. Cool down the reactor to 25-30° C. Wash the lot with excess water, siphon the water out of the reactor and wash again with large excess of water. Adjust the pH to 10-13 with caustic soda solution (50%) and drain the lot. Charge 290-350 g sodium hydroxide solution (32%) and 115-140 g pellets to the reactor with 150-200 g of water. Agitate and dissolve the pellets. Charge the resin and heat to 100-135° C., and hold at that temperature for 48-72 hours. Cool to <60° C. and add water. Drain the mother liquor completely. Charge 5 times 200-400 g of hot water (60° C.) and agitate for 2-5 hours. Drain the lot completely and repeat the hot water wash step 4 times. Drain the batch completely and charge water. Charge 270-350 g of hydrochloric acid. Charge more water (3-4 liters) and verify the pH is between 5-6 at the end. Pack the lot.

Example 15

Preparation of a Chelating Resin

The preparation of an alkylaminophosphonic gellular chelating resin is found in Example 1.0 of U.S. Pat. No. 4,002,564.

Example 16

Preparation of a Macroreticular Porous Chelating Resin

The preparation of an alkylaminophosphonic macroporous chelating resin is described in the U.S. Pat. No. 5,804,606 in Examples 1 and 2.

Example 17

Preparation of a Bifunctional Strong Base—Chelating Resin 100 grams of macroreticular copolymer was reacted following U.S. Pat. No. 5,804,606. The resin thus formed can be quaternized with methyl chloride to provide a bifunctional ion exchange resin comprising a strong base site near a phosphonic group.

Quaternization:

Charge 80-120 g of alkylaminophosphonic macroporous chelating resin into the reactor and charge 200-300 ml. of methanol. Add 100-150 g of methyl chloride. The temperature of the reaction should be 10-25° C. and pressure less than 5 psig. Hold the temperature below 30° C. for 5.0-9.0 hour. Heat the reactor to 38-48° C. and hold it for 1.0-4.0 hour at 38-48° C. Drain the lot and wash it with a large excess of water (15 times the volume of the reactor) for 7 hours (draining and filling continuously). The product is then drained and packed. A chelating resin with a strong base characteristic is obtained.

Example 18

Preparation of an Iminodicarboxylic Acid-Functionalized Resin

The preparation of an iminodicarboxylic acid-functionalized resin is found in Example 3.0 of U.S. Pat. No. 5,804,606.

Example 19

Preparation of an N-Methylglucamine-Functionalized Resin

Chloromethylated resin is prepared from 100 g of 6.0% DVB crosslinked macroreticulated polystyrene/DVB material.

A chloromethylated intermediate is prepared by making a complex with 250 g aqueous formaldehyde solution (55% formaldehyde, 35% MeOH), 53 g methanol, 75 g water and 490 g of CSA. Charge 100 g of copolymer to the reactor and wait for 1 hour. The temperature should then be below 25° C. 15 g of FeCl$_3$ (40% w/w) solution is then added for 1 hour without getting to a temperature higher than 40° C. Heat the reactor to 40° C. for 2 hours. Cool down the reactor to 30° C., water wash the product with excess of DI water. Neutralize the lot. Add again 500 g of methanol, 200 g of N-methylglucamine and 40 g of sodium carbonate. Heat to 80° C. and keep the reaction for 24 hours. A water wash is then done and the resin is neutralized with caustic soda.

Example 20

Quaternization of the N-Methyl Glucamine (Q-Resin) from Example 19 or Diethanolamine Resin (DEA) from Example 10

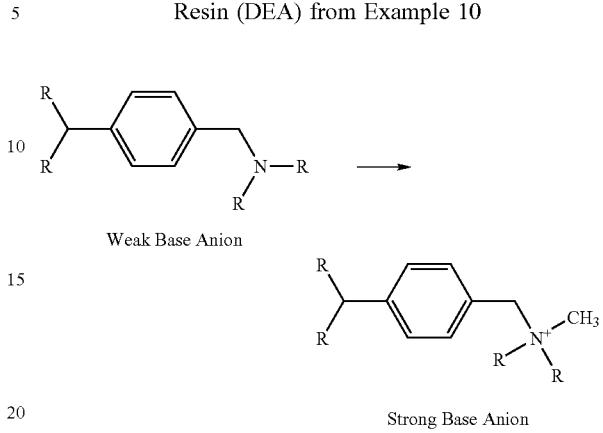

Weak Base Anion

Strong Base Anion

Quaternization:

Charge 80-120 g of glucamine functionalized macroreticular-chelating resin or the DEA gellular resin into the reactor and charge 200-300 ml. of methanol. Add 120-180 g of methyl chloride. The temperature of the reaction should be 10-25° C. and pressure less than 5 psig. Hold the temperature below 30° C. for 5.0-9.0 hour. Drain the lot and wash it with large excess of water (15 times the volume of the reactor) for 7 hours (draining and filling continuously). The product is then drained and packed.

Q-IRA743: Total Weight Cap. 1.91: 1.42 Strong Base Capacity and Weak Base Capacity 0.49.

Q-DEA: Total Weight Cap. 2.67: 0.95 Strong Base Capacity and Weak Base Capacity 1.72.

Example 21

Preparation of a Polyamine Condensate Anion Exchange Resin

Charge 1500-1871 g of orthodichlorobenzene (DCB), 300-470 g of epichlorohydrin (EPI). Stir and heat to 35-50° C. A mixture of triethylentetramine (TETA) in 500-600 g of water is added to the reactor. The molar ratio of epichlorohydrin/TETA was between 2.1 and 3.8. The reactor is cooled to maintain a temperature between 35-55° C. Upon completion of the amine addition, 100-700 g of DCB is charged to the reaction mixture. Novar 400 (0.015-0.050% of the total DCB) is charged. The suspension is then heated to distill the DCB. At the end of the distillation the temperature reaches 125-135° C. After holding the lot for 2-6 hours, the reaction mixture was cooled to 70-95° C. DCB is then steam distilled until the beads are free from solvent odor. The lot is cooled to 25-40° C. and washed with 50% solution of caustic soda. The capacity of the resin is between 9 and 13.0 meq/g dry resin. In a further reaction, the weak base resin thus prepared is quaternized with methyl chloride as illustrated in previous examples.

Example 22

Preparation of an Acrylic Weak Base Gel Ion Exchange Resin

The copolymer used is a gel-type methyl acrylate polymer crosslinked with divinylbenzene (4%) and diethyleneglycol divinyl ether (1%). The ion exchange resin obtained from this process is a gel type, acrylic, weakly basic anion exchange resin. The functionality is a dimethylaminopropyl group (DMAPA) attached to the acrylic backbone via an amide group.

Aminolysis:

400-600 g of DMAPA are charged in the reactor as well as 100-150 g of the acrylic copolymer. This process is run at high temperature (170-189° C.), under nitrogen pressure between 35-60 psig for 8-24 hours. Cool the reactor to 20-40° C. Drain the mother liquor from the batch. Add methanol until the level is above the resin bed. Continue draining and adding more fresh methanol for 3 hours. Start feeding water to the top of the bed, draining to maintain the water level above the resin bed. Wash thoroughly with water for 2 hours. Drain the reactor and hand screen the final resin.

Example 23

Preparation of a Macroreticular Weak Base Anion Exchange Acrylic Resin

The copolymer used to manufacture this resin is a macroreticular (MR)-type methyl acrylate polymer crosslinked with divinylbenzene (5% w/w) and diethyleneglycol divinyl ether (2.0% w/w). The resin obtained following the next process is a MR, acrylic, strongly basic anion exchange resin in the chloride form. The functionality is a propyl dialkylammonium weak base group attached to the acrylic backbone via an amide linkage. The conversion of the copolymer to anionic resin is done using dimethylaminopropylamine (DMAPA).

Aminolysis:

400-600 g of DMAPA are charged in the reactor as well as 100-150 g of the acrylic copolymer. This process is run at high temperature (170-189° C.), under nitrogen pressure between 35-60 psig for 8-24 hours. Cool the reactor to 20-40° C. Drain the mother liquor from the batch. Add methanol until the level is above the resin bed. Continue draining and adding more fresh methanol for 3 hours. Start feeding water to the top of the bed, draining to maintain the water level above the resin bed. Wash thoroughly with water for 2 hours. Drain the reactor and hand screen the final resin.

Example 24

Preparation of a Macroreticular Strong Base Anion Exchange Acrylic Resin

The conversion of the MR type methyl acrylate polymer crosslinked with divinylbenzene (5% w/w), diethyleneglycol divinyl ether (2.0% w/w) copolymer to anionic resin is done in two steps; aminolysis with dimethylaminopropylamine (DMAPA) followed by quaternization.

Quaternization:

Charge 150 g of the weak base acrylic macroreticular resin from Example 23. Then charge 300 ml of methanol and add 75 g of methyl chloride. The temperature of the reaction should be 10-25° C. and pressure less than 5 psig. Hold the temperature below 30° C. for 4.0-9.0 hour. Heat the reactor to 38-48° C. and hold it for 1-5 hour at 38-48° C. Drain the lot and wash it with large excess of water (15 times the volume of the reactor) for 7 hours (draining and filling continuously). The product is then drained and packed.

Example 25

Preparation of Copolymer Adsorbents

The synthesis of Polymeric Adsorbents is described in U.S. Pat. No. 6,387,974.

Example 26

Preparation of Copolymer Adsorbents

A typical crosslinked macroporous copolymer preparation, for example, may include preparation of a continuous aqueous phase solution containing suspension aids (such as dispersants, protective colloids and buffers) followed by mixing with a monomer mixture containing a polyvinylaromatic monomer, free-radical initiator and typically 0.2 to 5, preferably 0.3 to 3 and more preferably 0.4 to 1 parts porogen (such as toluene, xylenes, ($C_4$-$C_{10}$)-alkanols, ($C_6$-$C_{12}$)-saturated hydrocarbons or polyalkylene glycols) per one part monomer. The mixture of monomers and porogen is then polymerized at elevated temperature and the porogen is subsequently removed from the resulting polymer beads by various means; for example, toluene, xylene and ($C_4$-$C_{10}$) alcohols may be removed by distillation or solvent washing, and polyalkylene glycols by water washing. The resulting macroporous copolymer is then isolated by conventional means, such as dewatering followed by drying.

Example 27

Equilibration Test for Arsenic in Resins: Arsenite, Arsenate, Sulfate and Silicate Anions in the Water The media (resins or GFH) used was Buchner dried, then 0.05 grams (dry basis) of resins or GFH were charged in vials with 17 ml of solution. The starting solution concentration is reported in the table. They were shaken for 48 hours and the concentration of the solution was measured using IC (ion chromatography) technique. The unreacted anion concentration from the liquid is used to calculate the reacted anions to the media (GFH, anionic, cationic or adsorbents). The result is reported as unreacted final As (ppm), sulfate (ppm) in the liquid solution and the reacted arsenic in the resin expressed in: mg As/g dry resin.

| Example | Anions Used in the Test | | | | |
| --- | --- | --- | --- | --- | --- |
| | Arsenite (ppm) | Arsenate (ppm) | Sulfate (ppm) | Silicate (ppm) | pH |
| 27a | 0 | 200 | 0 | 0 | 4-7 |
| 27b | 0 | 800 | 0 | 0 | 4-7 |
| 27c | 0 | 200 | 200 | 0 | 4-7 |
| 27d | 0 | 200 | 200 | 0 | 7-9 |
| 27e | 0 | 200 | 200 | 40 | 4-7 |
| 27f | 0 | 200 | 200 | 40 | 7-9 |
| 27g | 200 | 0 | 200 | 0 | 4-7 |
| 27h | 0 | 800 | 400 | 0 | 4-7 |
| 27i | 0 | 200 | 0 | 40 | 4-7 |
| 27j | 0 | 200 | 0 | 40 | 7-9 |

Example 28

Equilibration Test for Arsenic in Resins: Arsenate and Sulfate as Anions. Time Needed for Equilibration Following Example 27c and the IRA410 (Strong Base Anion resin in chloride form).

| Sample # | Time of Sampling (days) | As (ppm) | $SO_4^{-2}$ (ppm) |
| --- | --- | --- | --- |
| Initial | 0 | 200 | 200 |
| 39a | 1 | 121 | 52 |
| 39b | 4 | 123 | 54 |
| 39c | 7 | 122 | 51 |

Example 29

Preparation of a Strong Base Anion Exchange Resin Loaded with Iron (II)

The resin from Example 11 was used in the process of loading the metals to its structure.

200 ml of a 40% aqueous solution of $FeCl_2$ is added to the 30 g of resin in a reactor and mix for 4 hours. The solution is siphoned out of the reactor. The resin beads are then put in contact with 200 ml of a 4% w/w $NaHCO_3$ solution. At the same time air was bubbled in the system for 40 minutes with stirring at the same time. After this step is done the resin is excess water washed to eliminate the remaining and to clean the resin. The final pH was 5.2. The resin is then an anionic resin loaded with iron.

Example 30

Preparation of a Metal Loaded Adsorbent Resin

The macroporous adsorbent described in U.S. Pat. No. 6,387,974 can be used in combination with metals such as iron, titanium, zirconium, iron, manganese for arsenic removal applications. The metals salts that could possibly be used include, without limitation: $FeCl_3$ or $AlCl_3$ or $ZrOCl_2$ or $TiCl_3$ or $MnCl_2$ or combinations thereof. They are used in water solutions at low pH.

10 grams of copolymer adsorbent is mixed with 50 ml of a 40% w/v acid aqueous solution of $FeCl_3$. The pH is below 2.0. The resin is gently stirred for 96 hours. The beads are drained from the excess liquid solution. 100 ml of 4% sodium hydroxide is added to the reactor, and after 60 minutes of contact time with the caustic solution, agitation is begun. Agitation is continued for 15 minutes and then the reactor is drained again. An excess of water is used to wash the resin to neutral pH. The lot is then drained and packed.

Example 31

Preparation of a Metal Loaded Macroporous poly(vinyl alcohol) Resin

A porous polyvinyl alcohol resin was obtained via the following process:

The synthesis of the poly(vinyl alcohol) crosslinked macroporous resin was done following the process described by Ying W., et al., 'Preparation and characterization of high loading porous crosslinked poly(vinyl alcohol) resins', *Polymer* vol. 45 pp. 71-77 (2004).

This poly(vinyl alcohol) macroporous resin can be loaded with metals using the following procedure:

30 grams of porous polyvinyl alcohol resin as described above is charged into a column. Separately, 1000 ml of a 4% w/v aqueous $FeCl_3$ solution is made. The pH of the solution is <2.0. The ferric solution is passed through the column in 60 minutes. 4000 ml of sodium carbonate 5% solution at pH 7.5 are added in a continuous way at a flow rate of 2 BV/h. An excess of DI water is used to wash the resin to a final pH of 5.5. The lot is then drained and packed.

Example 32

Metals Loading Process in Column for Cationic Resins

The following resins: Amberlyst™ 36 WET, Amberlyst™ 15 wet, Amberlyst™ 16 wet, Amberlyst™ 39 wet, 200CNa, SR1LNa, Quaternized-IRC743 were loaded with: metal salts in water solution. The salts used were: $AlCl_3$, $FeCl_3$, $MnCl_2$, $ZrOCl_2$ and $TiCl_3$.

The cationic resins were put in contact with metal solutions at low pH (lower than 3). 20 g of sample were charged to a column. One liter of 4% w/v solutions of zirconyl chloride, zirconium sulfate, aluminum chloride, manganese chloride, iron chloride or iron sulfate was passed through the column for 40 minutes. The resin was then washed with excess water. The final pH of the effluent from the column was 5.5. The resins were then drained and packed.

Example 33

Metals Loading Process for Cation Resins

Amberlyst™ 36 WET, Amberlyst™ 15 Wet, Amberlyst™ 16 Wet, Amberlyst™ 39 Wet, Amberlite™ 200C Na, Amberlite™ SR1L Na were loaded with: metals used following this procedure were: $AlCl_3$, $FeCl_3$, $MnCl_2$, $ZrOCl_2$ and $TiCl_3$.

20 g of Buchner dried sample was charged to a column. 60 ml of 40% w/v metal salt solution was added to the column. Once the column is charged it was air mixed for 60 minutes. The next step was to completely drain the excess of iron solution. 2 BV of DI water were added and then completely drained. In a continuous addition mode 40 BV of DI water were added at 2 BV/h until the final pH of the effluent was higher than 5.2. The resin was then Buchner dried and ready for application testing.

Example 34

Cation Gel, MR, Polysulfonated and Low DVB Resins Iron Loading Process in Column—Low pH of Precipitation The following resins: Amberlite™ SR1L Na (gel), Amberlite 200CNa (MR), Amberlite 121 (Low DVB content), Amberlite 36 Wet (Polysulfonated), IRC743 were loaded with Fe (III) following the procedure herein described.

20 g of Buchner dried sample was charged to a column. 60 ml of 40% w/v $FeCl_3$ solution was added to the column. Once the column was charged it was air mixed for 60 minutes. The next step was to completely drain the excess of iron solution. 2 BV of DI water were added and then completely drained. In a continuous addition mode 40 BV of DI water were added at 2 BV/h until the final pH of the effluent was higher than 5.2. The resin was then Buchner dried and ready for application testing.

Example 35

Cation Gel, MR, Polysulfonated and Low DVB Resins Iron Loading Process in Column—High pH of Precipitation The following cationic resins: Amberlite™ SR1L Na (gel), Amberlite 200CNa (MR), Amberlite 121 (Low DVB content), Amberlite 36 Wet (Polysulfonated), were loaded with Fe(III) following the procedure herein described.

20 g of Buchner dried sample was charged to a column. 60 ml of 40% w-v $FeCl_3$ solution was added to the column. Once the column was charged it was air mixed for 60 minutes. The next step was to completely drain the excess of iron solution. 2 BV of DI water were added and then completely drained. 60 ml of 25% w caustic solution was added to the resin. The pH was above 10. In a continuous addition mode 40 BV of DI water were added at 2 BV/h until the final pH of the effluent was between 6-7 (neutral). The resin was then Buchner dried and ready for application testing.

Example 36

Metal Loading Process for Strong Base Anion Styrenic Resin Metal Loading Process 20 grams of anion exchange resin are charged to a reactor. 100 ml of a concentrated solution of the metal salt water solution (40% w/v $ZrOCl_2$) is added. The reactor is agitated for 4 hours at room temperature. The liquid is then siphoned out of the reactor. A caustic soda solution (25%) is gently added to the reactor until the pH is higher than 12 and at least 2 BV of liquid are in the reactor. The lot is gently agitated for at least 15 minutes before the liquid is siphoned out of the reactor. 2 BV of DI water are added to the reactor. The agitation is then started. A continuous washing step is started. Water is added to the reactor and at the same time it is siphoned out keeping the column of water in the reactor constant. The final pH in the reactor was neutral and the liquid coming from the reactor clear. The lot is transferred to a column to backwash fines and unbound iron to the beads. The resin is then water drained and ready for arsenic removal.

Example 37

Metal Loading Process for Strong Base Anion Styrenic Resin Metal Loading Process 20 grams of anion exchange resin are charged to a reactor. 100 ml of a metal salt solution of (40% w/v $FeCl_3$) is added. The reactor is agitated for 4 hours at room temperature. The liquid is then siphoned out of the reactor. A caustic soda solution (25%) is gently added to the reactor until the pH is higher than 12 and at least 2 BV of liquid are in the reactor. The lot is gently agitated for at least 15 minutes before the liquid is siphoned out of the reactor. 2 BV of DI water are added to the reactor. The agitation is then started. A continuous washing step is started. Water is added to the reactor and at the same time it is siphoned out keeping the column of water in the reactor constant. The final pH in the reactor was neutral and the liquid coming from the reactor clear. The lot is transferred to a column to backwash fines and unbound iron to the beads. The resin is then water drained and ready for arsenic removal.

Example 38

Amberlite IRA410 Gel Type Resin—Iron Loading 20 g of Amberlite IRA410 are charged in a reactor. A solution of $Fe_2(SO_4)_3 \cdot 6.5H_2O$ (Aldrich) (100 g of ferric sulfate salt in 150 g of water) was added to the reactor. The reactor was then agitated for 3 hours. After this period of time the liquid was siphoned out and the resin in the reactor was mixed with a 25% caustic soda solution (100 ml) for 15 minutes. The liquid was siphoned out. The resin in the reactor was then plug-flow washed with 20 liters of DI water. The final pH was in the range of 5-7. The resin was then backwashed for fines removal and ferric precipitates in a column and packed. The resin was Buchner dried before using it for the Arsenic selectivity test.

Example 39

Comparison of GFH, Iron Loaded Cationic Resins or Anionic Ones

Column Testing:

The column used in the experiment has a diameter of 10 mm, height 250 mm. The resin volume used in the column is 8.0 ml and a comparison with GFH (ground ferric hydroxide). The resin used was synthesized following example 36. The concentration of the solution used is: a) 50 ppm or b) 200 ppm of Arsenic (V) and a) 200 ppm or b) 2000 ppm of sulfate anions. The temperature was room temperature, flow rate was 3.0 ml/min, and the volumetric flow rate was 22.6 BV/hr. The effluent accumulated in a tank during all the runs. The columns were run for 24 hours and the total arsenic concentration was measured using IC. Iron leachability from the columns during the run was measured with an influent of 50 ppm As (V), 200 ppm $SO_4^{-2}$. The lower detection limit of the ICP calibration curve used was 50 ppb for iron.

Example 40

Use of Arsenic-Selective Resins in Deionization Systems

In one variant, the resins of the present invention are used in conventional arsenic removal systems commercially available from system suppliers such as; U.S. Filter, Layne Christensen, Severn Trent and Basin Waters. By way of further example, an Advanced Deionization System (ADI) is commercially available from Rohm and Haas Company and is used with resins of the present invention. This system is described in U.S. application Ser. No. 10/315,773 to Miers, et. al., and uses as an essential component a fractal liquid distributor, i.e., a device for substantially evenly distributing a liquid by means of flow paths which are approximately hydraulically identical. Systems of this type are disclosed, for example, in U.S. Pat. Nos. 4,999,102 and 5,354,460; and in M. Kearney; "Control of Fluid Dynamics with Engineered Fractals"; *Chem. Eng. Commun.*; vol. 173, 43-52 (1999). Preferably, the cylindrical vessels used in the system are pressure vessels, and are set up in a vertical configuration. The vessels are stationary, i.e., when the system is operated, the vessels are fixed in position, but the vessels can be removed when taken offline. The vessels and associated piping and valves are constructed of any material compatible with the water being treated and the regenerant solution(s). Preferred materials include, for example, butyl-rubber lined steel and stainless steel. Preferably, the treatment medium substantially fills the interior of the vessel when the medium is swelled by the water. The vessels have flat heads and flat bottoms, reducing the height of the vessels relative to vessels having curved heads and bottoms. Preferably, the inside diameter of the vessels is from 0.6 m to 1.5 m. Preferably, the inside diameter of the vessels is at least 0.75 m, more preferably at least 0.9 m. Preferably, the inside diameter is no more than 1.25 m. In one preferred embodiment, the inside diameter of the vessels is from 1.1 m to 1.25 m. The height of the vessels preferably is at least 0.6 m, more preferably at least 0.9 m, and most preferably at least 1.1 m. Preferably, the height of the vessels is no more than 1.3 m.

The use of vessels having flat heads and fractal liquid distributors minimizes waste volumes by producing a sharp "wave front" between process and regenerant streams, regenerant and rinse streams, and rinse and process streams. In traditional vessels, there is considerable mixing between the streams, with the result that some of the process stream or a rinse stream becomes mixed with regenerant and must be disposed of as waste, thereby increasing the total waste volume. The use of flat heads on the vessels eliminates mixing of the streams in the head space, as typically occurs in traditional vessels having domed heads. Fractal liquid distributors evenly distribute and collect both the process and regenerant streams, thereby approximating plug flow in the vessels, and allowing a sharp separation between the streams.

In a preferred embodiment, the water treatment system comprises from two to five vessels containing an anion exchange resin. Typically, a pair of vessels is used in parallel to treat water, with simultaneous regeneration of one or more vessels. Preferably, the water treatment system comprises three or four vessels. In one preferred embodiment, the ion exchange system contains three vessels; in this embodiment, two vessels are used in parallel to treat water while the third vessel is regenerating. In a preferred embodiment, the ion exchange system, including three vessels and associated piping, is constructed on a support frame ("skid"), and measures no more than 2.30 m wide by 2.37 m high by 6.08 m long. These dimensions allow each part to fit within a standard sea transport container. Preferably, each vessel has two manifolds ("headers") constructed from piping to distribute or collect flow to or from the vessels, and attached to each end, with two valves to control flow in and out of the vessel.

In a preferred embodiment, the beads are commercially available uniform particle size resins having a harmonic mean size from 400 microns to 700 microns, more preferably from 500 microns to 650 microns, and most preferably from 600 microns to 650 microns. Preferably, at least 95% of the beads are within 50 microns of the mean. Most preferably, at least 95% of the beads are in a size range from 580 microns to 680 microns. Uniform particle size resins are known and are manufactured by various methods, including screening, expanding and jetting.

Even distribution of flow and use of resin beads in the preferred particle size range allow use of higher flow rates. Preferably, water is treated at a flow rate from 10 m$^3$/hour to 60 m$^3$/hour per vessel, more preferably at a flow rate of at least 20 m$^3$/hour per vessel, more preferably at least 30 m$^3$/hour per vessel and most preferably at least 40 m$^3$/hour per vessel. In one preferred embodiment, water is treated at a flow rate from 40 m$^3$/hour to 60 m$^3$/hour per vessel. In another preferred embodiment, water is treated at a flow rate from 30 m$^3$/hour to 40 m$^3$/hour per vessel. In another preferred embodiment, water is treated at a flow rate from 20 m$^3$/hour to 30 m$^3$/hour per vessel. Preferably, the smaller flow ranges correspond to the smaller vessel sizes mentioned herein. This system allows construction of a compact ion exchange system that can accommodate high flow rates through a relatively small resin bed (i.e., high linear space velocity), while achieving good performance and efficiency. Preferably, the ADI system is operated at a linear space velocity of at least 35 hr$^{-1}$, most preferably at least 40 hr$^{-1}$. The following table compares this system with a conventional ion exchange system:

| Parameter | Conventional Method | ADI |
|---|---|---|
| vessel head | dome | flat |
| flow distributor | nozzle plate | fractal manifold |
| resin particle size | 550 +/− 50 μm | 550 +/− 50 μm |
| degasifier | forced draft | membrane |
| vessel inside diameter | 1.384 m (cation) 1.784 m (anion) | 1.19 m (both) |
| resin volume | 2.5 m$^3$ | 1.4 m$^3$ |
| service flow rate | 50 m$^3$/hr | 60 m$^3$/hr |
| linear space velocity (service flow rate/resin volume) | 20 hr$^{-1}$ | 43 hr$^{-1}$ |
| conductivity of output | <0.5 μS/cm | <0.5 μS/cm |
| silica | <10 ppb | <10 ppb |
| regeneration time | 3–3.25 hr | 1 hr |
| water use (bed volumes, BV) | 5.1–6.8 BV | 2 BV |

It is evident from the data that the ADI system can be operated at a much higher linear space velocity, a measure of volume throughput relative to vessel size, than the conventional system. Moreover, regeneration times are greatly reduced, which reduces the time during which the vessels are not producing deionized water, and water use in bed volumes also is reduced considerably. Consequently, the system can treat water at high volume flow rates using smaller vessels, relative to conventional systems, with similar performance. This discovery allows manufacture of a compact ion exchange system that is readily shipped in a standard container, and which also has greater efficiency, measured in terms of waste and time off-line.

Another system in which an arsenic-selective resin may be used is the AMBERPACK system commercially available from Rohm and Haas Company, in which the resin vessel is packed completely and uses a plate and nozzle configuration which allows a uniform front to be established during the loading of arsenic-containing water.

The resin may also be used with excellent effectiveness in a traditional ion exchange configuration using a column and a traditional distribution system.

TABLE 1

Industrial Samples with no treatment.

| Resin | Type | Anions in Background of Water Used | ICP %-Fe | ppm As | ppm Sulfate | mg As/g dry resin |
|---|---|---|---|---|---|---|
| Amberlite SR1LNa | SAC | Sulfate - Arsenate (Example 27d) | 0 | 200 | 200 | 0 |
| Amberlite IRA-410 | SBA | Sulfate - Arsenate (Example 27d) | 0 | 117 | 56 | 58 |
| Amberlite IRA-410 | SBA | Arsenate (Example 27a) | 0 | 42 | 0 | 102 |

Table 1 shows concentration of anions at the end of the equilibrium test from Examples 27c and 27a. Note: Run in 27-a conditions is run with no sulfate.

TABLE 2

Adsorbents - Iron (III)

| | | Equilibrium | | Anions at the end of the Test | | mg As/g |
|---|---|---|---|---|---|---|
| Ex. Number | Adsorbents | Test Used | ICP %-Fe | ppm As | ppm $SO_4^{-2}$ | dry media |
| Ind. Sample | Amberlite™ XAD1180 | 27b | 0 | 413 | 810 | 0 |
| Ind. Sample | Amberlite XAD1600 | 27b | 0 | 418 | 804 | 0 |
| 30 | Amberlite XAD1180 | 27c | 4.51 | 179 | 191 | 14 |

Equilibrium Test from example: 27d and 27c.

TABLE 3

Metal Loaded Cationic and Anionic Resins. Different metals.

| | | Synthesis | Concentration at end of test (27c.) | | Calc. mg As/g |
|---|---|---|---|---|---|
| Resin | Metal Used | Example # | ppm As | ppm Sulfate | dry resin |
| Amberlite™ SR1L | Fe | 32 | 173 | 189 | 14 |
| Amberlite 200C Na | Fe | 32 | 116 | 197 | 67 |
| Amberlite SR1L | Fe | 35 | 200 | 200 | 0 |
| Amberlite 121 | Fe | 32 | 122 | 205 | 66 |
| Amberlite IRA958 | Fe | 37 | 155 | 99 | 41 |
| Amberlite IRA410 | Fe | 37 | 100 | 86 | 54 |
| Amberlite IRA743-Q | Fe | 37 | 163 | 168 | 22 |
| DEA Q | Fe | 37 | 148 | 163 | 21 |

TABLE 3-continued

Metal Loaded Cationic and Anionic Resins. Different metals.

| | | Synthesis | Concentration at end of test (27c.) | | Calc. mg As/g |
|---|---|---|---|---|---|
| Resin | Metal Used | Example # | ppm As | ppm Sulfate | dry resin |
| Amberlite 200C Na | Zr | 36 | 154 | 197 | 30 |
| Amberlite IRA958 | Zr | 36 | 141 | 128 | 46 |
| Amberlite IRA410 | Zr | 36 | 101 | 118 | 65 |
| Amberlite IRA743-Q | Zr | 32 | 151 | 178 | 31 |
| DEA Q | Zr | 36 | 154 | 174 | 22 |
| Amberlite SR1L | Mn | 32 | 152 | 199 | 25 |
| Amberlite 200C Na | Mn | 32 | 118 | 200 | 51 |
| Amberlite SR1L | Al | 32 | 169 | 198 | 15 |
| Amberlite 200C Na | Al | 32 | 152 | 188 | 29 |
| Amberlite 200C Na | Cu | 32 | 179 | 197 | 9 |
| Amberlite SR1L | Cu | 32 | 180 | 197 | 8 |

TABLE 4

Strong Base Anionic Resins - Industrial grades.

| | | | Conc. of Anions at end of Test. | | mg As/g |
|---|---|---|---|---|---|
| SBA Resins Industrial Resins | Test Conditions | ICP %-Fe | ppm As | ppm Sulfate | dry resin |
| Amberlite™ IRA400 | 27a | 0 | 53 | 0 | 83 |
| Amberlite IRA410 | 27a | 0 | 42 | 0 | 89 |
| Amberlite IRA400 | 27c | 0 | 119 | 38 | 44 |
| Amberlite IRA410 | 27c | 0 | 114 | 55 | 55 |
| Amberlite IRA400 | 27c | 0 | 119 | 38 | 50 |
| Amberjet 4200 | 27c | 0 | 145 | 68 | 43 |
| IMAC HP555 | 27h | 0 | 385 | 699 | 14 |
| Amberlite PWA2 | 27h | 0 | 381 | 744 | 14 |
| Amberlite IRA958 | 27h | 0 | 370 | 645 | 22 |

TABLE 5

Strong Base Anion Exchange Resins

| | | | Concentration of anions at the end of the test | | Calc. mg As/g |
|---|---|---|---|---|---|
| Example Number | Anionic Resins: Weak Base and Strong Base: | Test Conditions | ppm As | ppm Sulfate | dry resin |
| 10 | Triethanolamine | 27d | 122 | 109 | 35 |
| 10 | Triethanolamine ethoxylated | 27d | 160 | 66 | 28 |
| 10 | Q. - Diethanolamine | 27d | 167 | 133 | 14 |
| 10 | Diethanolamine | 27d | 181 | 95 | 6 |
| 10 | Diisopropanolamine | 27d | 195 | 95 | 7 |
| 12 | Diethylenetriamine | 27d | 186 | 141 | 9 |

TABLE 6

Weak Base Resin and Strong Base Resin: IRA743 (N-methyl-glucamine functional group in this resin).

| | | | Equilibrium | | Concentration of anions at the end of the test. | | Calc. mg As/g |
|---|---|---|---|---|---|---|---|
| Example Number | Resin | Type | Test Used | ICP %-Metal | ppm As | ppm sulfate | dry resin |
| 32 | Amberlite IRA743-Q | SBA | 27d | Zr | 151 | 178 | 31 |

TABLE 6-continued

Weak Base Resin and Strong Base Resin: IRA743 (N-methyl-glucamine functional group in this resin).

| Example Number | Resin | Type | Equilibrium Test Used | ICP %-Metal | Concentration of anions at the end of the test. ppm As | ppm sulfate | Calc. mg As/g dry resin |
|---|---|---|---|---|---|---|---|
| 34 | Amberlite IRA743-Q | SBA | 27d | Fe | 163 | 168 | 22 |
| 20 | Amberlite IRA743-Q | SBA | 27d | No metal | 163 | 156 | 22 |
| 19 | Amberlite IRA743 | WBA | 27a | No metal | 171 | 0 | 19 |

Equilibrium Test from example: 27d. and 27a.

TABLE 7

Resins Loaded with metals.

| Example Number | Resin | Equilibrium Test Used | ICP %-Fe | Concentration of anions at the end of the test. ppm As | ppm Sulfate | mg As/g dry resin |
|---|---|---|---|---|---|---|
| Ind. Sample | Amberlite™ IRA410 | 27a | 0 | 115 | 55 | 55 |
| 38 | Amberlite IRA410 | 27a | 5.8 | 110 | 216 | 58 |
| 34 | 200CNa | 27a | 5.5 | 117 | 195 | 59 |

Equilibrium Test from example: 27d

TABLE 8

Equilibrium test with silica, sulfate and arsenate.

| Example Number | Resin | Initial Conditions of Test $SO_4$ (ppm) | As (ppm) | Si (ppm) | Concentration of anions at the end of the test. As (ppm) | $SO_4$ (ppm) | Calc. mg As/g dry resin |
|---|---|---|---|---|---|---|---|
| Ind. Sample | IRA410 | 200 | 200 | 0 | 124 | 64.3 | 49 |
|  | IRA410 | 0 | 200 | 40 | 50.8 | ND | 96 |
|  | IRA410 | 200 | 200 | 40 | 124.5 | 62.0 | 48 |
| Ind. Sample | GFH | 200 | 200 | 0 | 163.3 | 194.9 | 23 |
|  | GFH | 0 | 200 | 40 | 167.0 | 3.0 | 21 |
|  | GFH | 200 | 200 | 40 | 163.3 | 194.7 | 23 |
| 34 | 200C Na | 200 | 200 | 0 | 137.8 | 190.7 | 35 |
|  | 200C Na | 0 | 200 | 40 | 144.5 | N.D. | 31 |
|  | 200C Na | 200 | 200 | 40 | 142.6 | 194.8 | 32 |

The pH in this test was between 4.0-7.0

TABLE 9

Arsenite Results with Metal Loaded Resins:

| Example Number | Resin Type: | Metal in Resin | Initial Concentration of As(III) 189 ppm and $SO_4^{2-}$ 192 ppm. ppm As | ppm Sulfate | Calc. mg As/g dry media |
|---|---|---|---|---|---|
| Ind. Sample. | GFH | Fe | 45 | 187 | 90.2 |
| 37 | IRA405 | Fe | 101 | 27 | 61.5 |
| 37 | IRA410 | Fe | 119 | 22 | 43.1 |
| 38 | IRA410 | Fe | 146 | 127 | 28.8 |
| 36 | IRA410 | Zr | 155 | 12 | 24.7 |
| 32 | 200C Na | Zr | 184 | 205 | 3.9 |
| Ind. Sample. | IRA410 | Not used | 204 | 10 | 0.0 |

TABLE 10

The influent is 50 ppm As(V) and 200 ppm $SO_4^{-2}$ measured using IC technique. From Example 41.

| Time of Sample (hr) | GFH ppm $SO_4^{-2}$ | ppm As | Fe ppm in effluent | Amberlite 200C Na—Fe Loaded ppm $SO_4^{-2}$ | ppm As | Fe ppm in effluent |
|---|---|---|---|---|---|---|
| 1 | 200 | 31.0 | <0.050 | 200 | 30.9 | <0.050 |
| 2 | 200 | 30.0 |  | 209 | 34.8 |  |

TABLE 10-continued

The influent is 50 ppm As(V) and 200 ppm $SO_4^{-2}$ measured using IC technique. From Example 41.

| Time of Sample (hr) | GFH | | | Amberlite 200C Na—Fe Loaded | | |
|---|---|---|---|---|---|---|
| | ppm $SO_4^{-2}$ | ppm As | Fe ppm in effluent | ppm $SO_4^{-2}$ | ppm As | Fe ppm in effluent |
| 3 | 210 | 36.4 | | 227 | 37.4 | |
| 4 | 208 | 39.5 | <0.050 | 230 | 34.7 | <0.050 |
| 5 | 221 | 44.1 | | 201 | 35.0 | |
| 6 | 216 | 43.7 | | 202 | 35.9 | |
| 7 | 223 | 47.2 | | 201 | 36.7 | |
| 24 | 215 | 52.4 | <0.050 | 206 | 47.0 | <0.050 |

The breakthrough on the columns was not achieved in both cases.

TABLE 11

Comparison of Iron Loaded Anionic Resins, Cationic Resin and GFH media run in columns. From Example 41.

| Example | Influent | Material in Column Sample | ICP %-Fe in Resin Dry basis | mg As/g · resin |
|---|---|---|---|---|
| 39 | 20000 ppm $SO_4$ 200 ppm As | IRA410 | 0 | 0 |
| | | IRA-410 | 5.8 | 31 |
| | | GFH | Na | 26 |
| 39 | 2000 ppm $SO_4$ 200 ppm As | 200CNa | 9.2 | 31 |
| | | GFH | Na | 20 |
| | | IRA410 | 5.8 | 30 |

One embodiment of this invention uses as a base resin for metal loading an acrylic gel constructed from a copolymer of methyl acrylate/DVB with 2-5% DVB and 0-1.0% diethylene glycol divinyl ether as crosslinker. A more preferred embodiment would have 3-4% DVB and 0.45-0.55% diethylene glycol divinyl ether, with the most preferred being about 3.6% DVB and about 0.49% diethylene glycol divinyl ether. The copolymer would be functionalized with the functional group shown below:

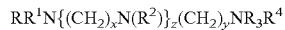

$$RR^1N\{(CH_2)_xN(R^2)\}_z(CH_2)_yNR_3R^4$$

where R denotes the resin, to which the amine nitrogen on the far left is attached via an amide bond with an acrylic carbonyl group or via a C—N bond to a $CH_2$ group on the acrylic resin; $R^1$ and $R^2$=H, Me or Et; x and y=1-4, z=0-2 and $R^3$ and $R^4$=Me, Et, Pr or Bu. A more preferred functionalization would have R attached via an amide bond; $R^1$=H or Me; z=0; y=1-4 and $R^3$ and $R^4$=Me or Et. The most preferred embodiment would have $R^1$=H; y=3 and $R^3$ and $R^4$=Me.

Another embodiment of this invention would use as a base resin for metal loading a macroreticular resin constructed from a copolymer of methyl acrylate/DVB made with 6-9% DVB and 1.1-3.0% diethylene glycol divinyl ether as crosslinker. A more preferred embodiment would have 7-8% DVB and 1.5-2.5% diethylene glycol divinyl ether, with the most preferred being about 7.6% DVB and about 2.0% diethylene glycol divinyl ether. The copolymer would be functionalized with the group described above where attachment to the resin is via an amide bond with an acrylic carbonyl group or via a C—N bond to a $CH_2$ group on the acrylic resin; $R^1$ and $R^2$=H, Me or Et; x and y=1-4, z=0-2 and $R^3$ and $R^4$=Me, Et, Pr or Bu. A more preferred functionalization would have R attached via an amide bond; $R^1$=H or Me; z=0; y=1-4 and $R^3$ and $R^4$=Me or Et. The most preferred embodiment would have $R^1$=H; z=0; y=3 and $R^3$ and $R^4$=Me.

Example 41

Gel or MR Acrylic/DVB or Styrenic/DVB Weak Base Anionic Resins—Iron Loading 30 g of resin and 50 ml of a 40% w/v solution of $FeCl_3$ were charged into a column. The column was air mixed for 3 hours and then completely drained. 0.5 BV of DI water was then charged to the column. 1.5 BV of DI water was passed through the column at a flow rate of 4.5 BV/hour. The column was then drained. 50 ml of a 12% caustic soda solution was added to the column. The column was air mixed for 2 hours and then backwashed with 10 BV of DI water. A solution of 5% $H_2SO_4$ is then used to achieve a neutral pH. The resin was Buchner dried before using it for the Arsenic selectivity test.

Example 42

Gel or MR Acrylic/DVB or Styrenic/DVB Weak Base Anionic Resins—Iron Loading 30 g of resin and 50 ml of a 40% w/v solution of $FeCl_3$ was charged into a column. The column was air mixed for 3 hours and then completely drained. 0.5 BV of DI water was then charged to the column. 1.5 BV of DI water was passed through the column at a flow rate of 4.5 BV/hour. A 4% DI water $NaHCO_3$ solution was used to wash the resin and increase the pH. This solution was passed at a flow rate of 3 BV an hour until the pH of the effluent of the column was 7.0. The pH was measured in the column and after one hour with air mixing was stable at 6.5. The lot was then Buchner dried and packed.

Example 43

Preparation of a Gel Strong Base Anion Exchange Acrylic Resin

The conversion of the MR type methyl acrylate polymer crosslinked with divinylbenzene (3.6% w/w), diethylene glycol divinyl ether (0.49% w/w) copolymer to anionic resin is done in two steps; aminolysis with dimethylaminopropylamine (DMAPA) followed by quaternization.

Quaternization:

Charge 150 g of the weak base acrylic macroreticular resin from Example 23. Then charge 300 ml of methanol and add 75 g of methyl chloride. The temperature of the reaction should be 10-25° C. and pressure less than 5 psig. Hold the temperature below 30° C. for 4.0-9.0 hour. Heat the reactor to 38-48° C. and hold it for 1-5 hour at 38-48° C. Drain the lot and wash it with large excess of water (15 times the volume of the reactor) for 7 hours (draining and filling continuously). The product is then drained and packed.

TABLE 12

Weak Base Acrylic Resin, Strong Base Acrylic Resin and Loaded with Iron.

| Example Number | Resin | Type | Equilibrium Test Used | ICP %-Metal | Concentration of anions at the end of the test. ppm As | ppm sulfate | Calc. mg As/g dry resin |
|---|---|---|---|---|---|---|---|
|  | GFH | GFH | 27d | Not done | 169 | 190 | 24 |
| 22 | Amberlite ™ IRA67 | WBA | 27d | None | 200 | 192 | 0 |
| 22 | Amberlite IRA35 | WBA | 27d | None | 217 | 186 | 0 |
|  | Amberlite IRA67 | WBA | 27d | Fe | 145 | 265 | 59 |
|  | Amberlite IRA-35 | WBA | 27d | Fe | 147 | 141 | 80 |
|  | Amberlite IRA67 | WBA | 27d | Fe | 120 | 112 | 91 |
|  | Amberlite IRA-458 | SBA | 27d | Fe | 149 | 98 | 52 |

Note:
Amberlite ™ IRA-35 resin is a MR acrylic resin made according to Example 43.

TABLE 13

The influent is 50 ppm As(V) and 200 ppm $SO_4^{-2}$ measured using IC technique. From Example 39.

| Time of Sample (hr) | GFH | | Amberlite ™ IRA35 - Fe loaded WBA | | Amberlite IRA67 - Fe loaded WBA | | Amberlite IRA900 (SO4) form - Fe loaded SBA | |
|---|---|---|---|---|---|---|---|---|
|  | ppm $SO_4^{-2}$ | ppm As | ppm $SO_4^{-2}$ | ppm As | ppm $SO_4^{-2}$ | ppm As | ppm $SO_4^{-2}$ | ppm As |
| 1 | 200 | 31.0 | N.D. | N.D. | 322 | N.D. | 291 | N.D. |
| 2 | 200 | 30.0 | 2 | N.D. | 278 | N.D. | 293 | N.D. |
| 3 | 210 | 36.4 | 9 | N.D. | 264 | N.D. | 243 | 7.8 |
| 4 | 208 | 39.5 | 43 | 6.1 | 262 | N.D. | 235 | 19.2 |
| 5 | 221 | 44.1 | 145 | 11.4 | 267 | N.D. | 220 | 30.3 |
| 6 | 216 | 43.7 | 206 | 14.1 | 264 | N.D. | 213 | 41.3 |
| 7 | 223 | 47.2 | 244 | 25.7 | 260 | 7.9 | 213 | 45.2 |
| 24 | 215 | 52.4 | 212 | 52.9 | 213 | 53.0 | 212 | 52.5 |

The breakthrough on the columns was not achieved in both cases. At times 1, 4 and 24 hours the Fe content in the effluent was <0.050 ppm for all the samples.

The invention claimed is:

1. A method for removing arsenic from water by contacting water with an acrylic gel which comprisies an amine substituent of structure

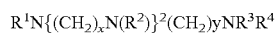

$$R^1N\{(CH_2)_xN(R^2)\}^2(CH_2)_yNR^3R^4$$

where an amine nitrogen bearing substituent $R^1$ is attached via an amide bond with an acrylic carbonyl group or via a C-N bond to a $CH_2$ group on the acrylic gel; $R^1$ and $R^2$=H, methyl or ehtyl; x and y=1-4, z=0-2 and $R^3$ and $R^4$=methyl, ethyl, propyl or butyl; wherein iron in its hydrous oxide form is entrapped in the acylic gel; to obtain an arsenic bound resin.

2. The method of claim 1 in which the amine nitrogen bearing substituent $R^1$ is attached via an amide bond with an acrylic carbonyl group; $R^1$=H or methyl; z=0; and $R^3$ and $R^4$=methyl or ethyl.

3. The method of claim 2 in which $R^1$=H; y=3; and $R^3$ and $R^4$=methyl.

4. The method of claim 3 in which the acrylic gel is a copolymer of methyl acrylate and divinylbenzene with 2-5% divinylbenzene residues.

5. The method of claim 1 in which the acrylic gel is a copolymer of methyl acrylate and divinylbenzene with 2-5% divinylbenzene residues.

* * * * *